April 30, 1940.   E. J. HABOUSH   2,198,871
FRACTURE REDUCING AND LIMB LENGTHENING DEVICE
Filed Aug. 4, 1936   9 Sheets-Sheet 3

INVENTOR.
Edward J. Haboush,
BY Hoguet, Neary & Campbell
HIS ATTORNEYS

April 30, 1940.  E. J. HABOUSH  2,198,871
FRACTURE REDUCING AND LIMB LENGTHENING DEVICE
Filed Aug. 4, 1936  9 Sheets-Sheet 7

INVENTOR.
Edward J. Haboush,
BY Hoguet, Neary & Campbell,
HIS ATTORNEYS

April 30, 1940.  E. J. HABOUSH  2,198,871

FRACTURE REDUCING AND LIMB LENGTHENING DEVICE

Filed Aug. 4, 1936  9 Sheets-Sheet 8

INVENTOR.
Edward J. Haboush,
BY Hoguet, Neavy & Campbell,
HIS ATTORNEYS

Patented Apr. 30, 1940

2,198,871

UNITED STATES PATENT OFFICE 2,198,871

FRACTURE REDUCING AND LIMB LENGTHENING DEVICE

Edward J. Haboush, New York, N. Y.

Application August 4, 1936, Serial No. 94,137

15 Claims. (Cl. 128—84)

The present invention is directed to an orthopedic device for accurately aligning and setting the severed ends of fractured bones and for lengthening bones.

Heretofore, the accuracy with which fractures have been set has been largely dependent upon the individual skill of the physician. Skilled practitioners are able, in the great majority of cases of simple fractures, to set the bone properly so that no deformity of the fractured member is occasioned. However, in the case of a severe fracture, or one in which the fracture is at an acute angle to the axis of the bone, it has been difficult to properly align the severed portions of the bone and to extend the bone to the same length as before the fracture occurred.

An object of the present invention is to produce a manually operated device, which in the hands of a medical practitioner renders the setting of even severe fractures an accurate mechanical procedure, with a consequent accurate, positive alignment and control of length of the set bone.

A further object of the invention is to produce a universally adjustable device which is capable of securing the severed ends of the bone, no matter what their angular relationship may be and thereafter moving the severed bones into their proper relative positions.

A still further object of the invention is to provide a device which is capable of adjustment to hold the aligned fractured member in fixed position during the application of a cast thereto, without possibility of disarrangement of the severed bone due to muscular contractions or inadvertent contact with the member.

A still further object of the invention is to provide an apparatus for imposing a stress upon bones for the purpose of lengthening the same.

To achieve the objects of the invention, I have invented means utilizing a plurality of wires passing through the adjacent ends of a severed bone for fixing one severed end in a predetermined position, and through an adjustable universally movable mechanism, the center of movement of which is the center of the fixed end of the bone, to swing the other severed portion around the fixed end of the bone, and to move it axially thereof to position the ends of the bone in their proper relative positions.

More specifically, my device comprises a base member, which may be arranged on or below an operating table or other support, and adjustable yokes on the base for holding and tensioning wires which are passed through the limb or member and bone above fracture. Preferably two or more of such yokes are utilized to hold the wires in angular relationship to prevent movement of the member along the wires. Supported also on the base member, and adjustable therealong is a universally adjustable carriage for supporting additional wire-holding and tensioning yokes, the wires being passed through the severed or broken off portion of the bone and limb or member, adjacent to and below the fracture. The carriage is adjustable so that its center of universal movement will coincide with the center of the end face of the bone above the fracture, and the carriage itself will lie substantially parallel to the bone below the fracture. Means are provided for extending the frame to pull the severed portions of the bone to their combined length before the fracture occurred, and also for swinging the bone horizontally and/or laterally and/or rotatably, into its proper alignment with the severed portion above the fracture.

Each of the vertical and horizontal movements of the carriage as well as the horizontal and vertical swing and rotary movements is individually controlled substantially micrometrically, so that through observation of the severed ends of the bone with the aid of an X-ray apparatus and fluoroscope, the ends of the bone may be properly abutted in the exact relationship that they had prior to the fracture.

The device further includes wire tensioning means forming a part of the bone-positioning yokes, which may be rapidly actuated for gripping and tensioning the wires passing through the bone, and also for quickly releasing the wires.

With the severed portions of the bone properly aligned, a cast of any desired type may be applied to the limb and member, and permitted to harden or set prior to release of the limb from the device. Thus there is no possibility of the severed ends of the bone moving relatively during the application of the cast thereto.

For a better understanding of the construction of my device, reference may be had to the accompanying drawings in which.

Figure 1:
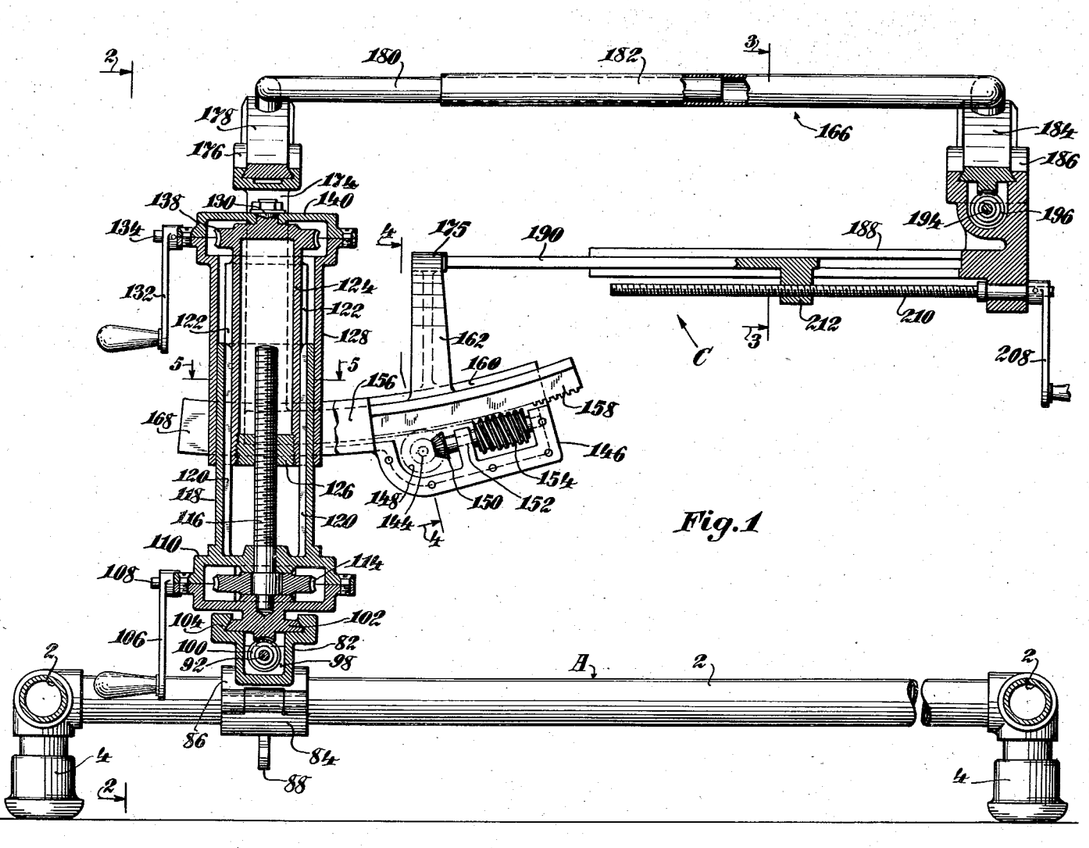
Fig. 1 is a sectional view of the preferred embodiment of my device taken on line 1—1 of Fig. 2.
Figure 23:
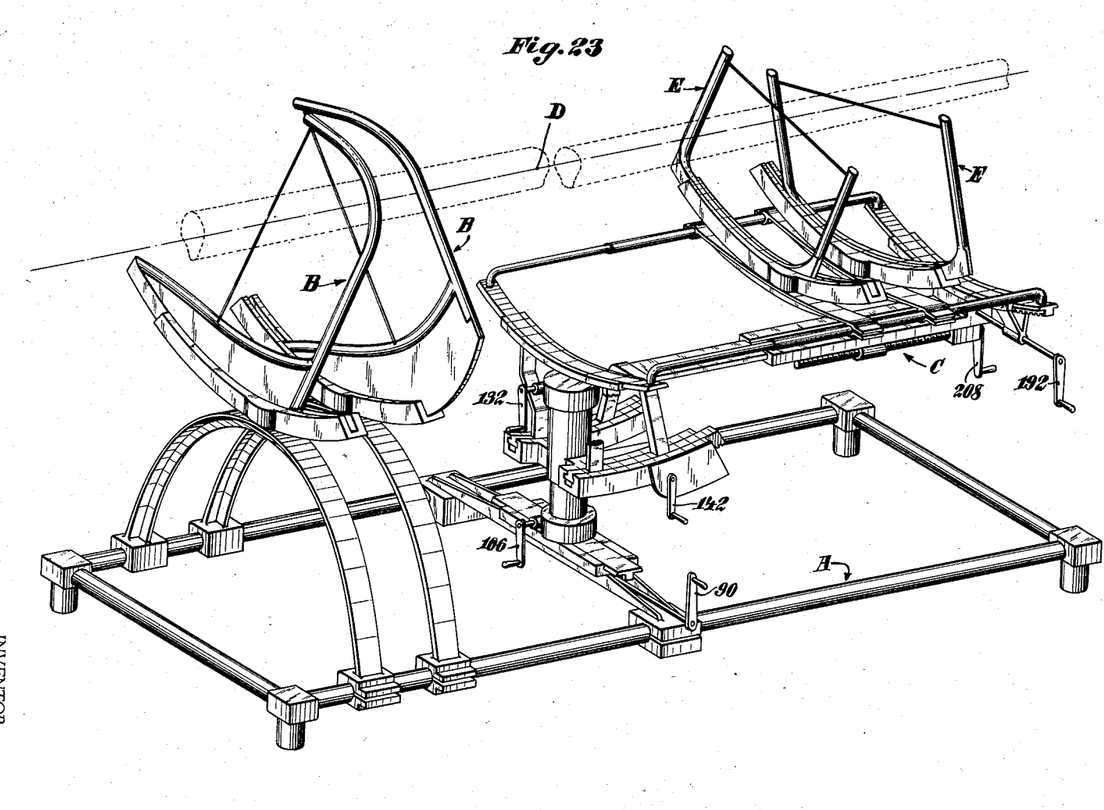

A typical embodiment of one form of my apparatus is disclosed in Figs. 1 and 23 and consists of a substantially rectangular framework or base member A made up of a series of tubular members 2 which as shown may be provided with short legs 4, acting as supports for the device.

Figures 6, 7, 8, 9:
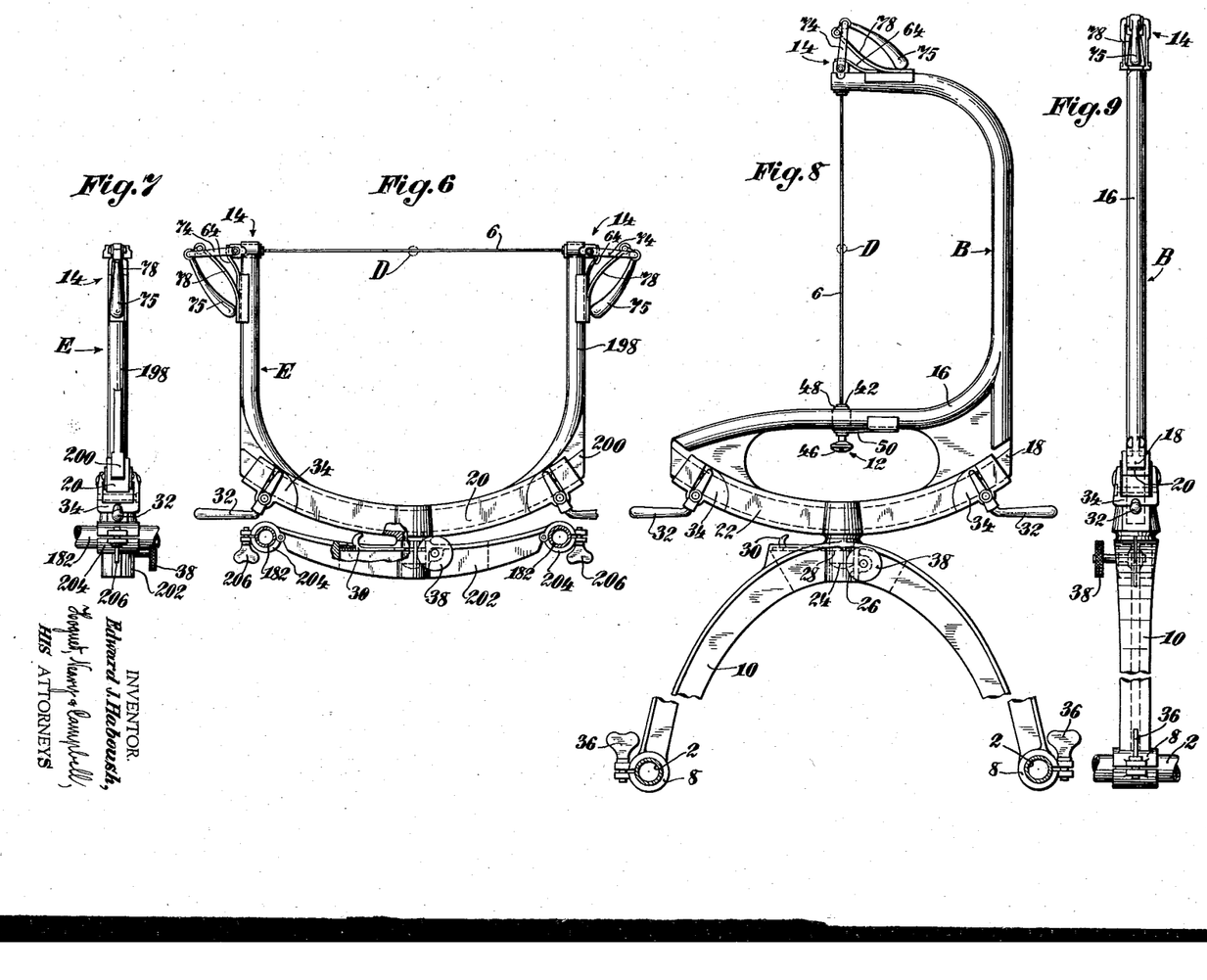
Fig. 6 is a view in elevation of one form of yoke for holding the severed member.
Fig. 7 is an end elevation of the yoke disclosed in Fig. 6.
Fig. 8 is a view in elevation of a yoke for holding the severed member.
Fig. 9 is an end elevation of the yoke disclosed in Fig. 8.
Figure 10:
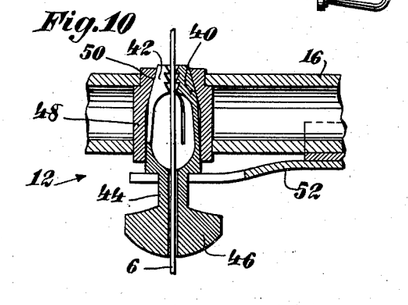
Fig. 10 is an enlarged view in section of a clamp for holding a bone-supporting wire.
Figure 11:
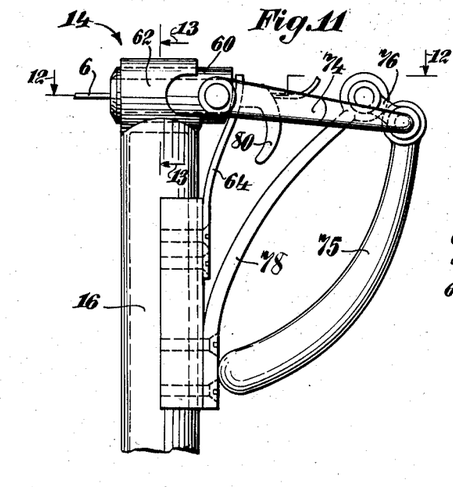
Fig. 11 is an enlarged elevational view of a wire tensioning clamp.
Figure 12:
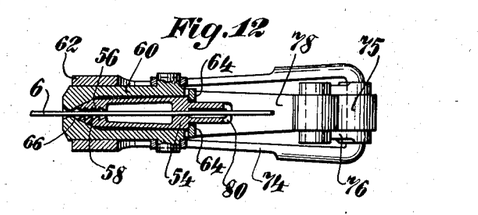
Fig. 12 is a sectional view of a wire-tensioning clamp taken on line 12—12 of Fig. 11.

The patient having a fractured or severed member is supported adjacent to and above the framework A, and a series of angularly related holes are drilled through the member and bone above, but closely adjacent to the fracture, and wires 6 as shown in Figs. 8 and 23 are passed through the holes. A series of yoke members B of the type disclosed in Figs. 8 and 9, slidably attached to the left hand end of tubular base member A through split sleeves 8 at the ends of arcuate support members 10, are moved into approximate alignment with the projecting ends of the wires 6, where the ends of the wires are passed through clamping devices 12 and 14 mounted in a yoke-shaped member 16. The yoke-shaped member 16, is provided with an arcuate slide portion 18, having a center of curvature at the wire 6 midway between the arms of yoke 16, slidably mounted in a corresponding arcuate slot 20 in a bridge member 22, the latter having a projecting shaft 24, swively mounted in split bore 26 of arcuate support member 10. The shaft 24 is provided with an annular groove 28 in which is received the end of a spring urged latch 30 permitting rotation but not removal of the shaft from the bore, unless the latch 30 is retracted. With the wire 6 loosely held in gripping member 14 the entire yoke B may be shifted along framework A until the gripping members 12 and 14 are in alignment with the plane of the drilled hole in the bone axially of the bone. The yoke 16 may then be rocked on its arcuate slide portion 18 until the wire 16 attains a straight line position axially of the hole in the bone, where the yoke 16 is clamped by means of pivoted bifurcated members 32 swinging against inclined cam surfaces 34 and compressing the walls of arcuate member 20 against arcuate yoke member 18. The same procedure is followed with each of the series of yoke members B, until the wires 6 are aligned as above indicated. Each yoke B is then clamped tightly to the framework A by wing screws 36. Each yoke 16 may also be swivelled about shaft 26 to avoid contact with the other yokes, and to center the wires 6 in the holes in the bone, if the holes are not drilled exactly at right angles to the bone. The yokes 16 are then clamped by means of set screw 38 bridging the split of bore 26.

As previously indicated, the wire 6 is received in gripping members 12 and 14, shown respectively in Fig. 10 and Figs. 11 to 13, inclusive. Gripping member 12 (Fig. 10) consists of a unitary chuck member 40 having flexibly united toothed jaws 42 with inclined outer surfaces, a reduced neck 44, and a manipulating knob 46, with an axial bore therethrough. The chuck member 40 is urged into a socket 48 in yoke 16 having a tapered inner surface 50 by a bifurcated leaf spring 52 engaging the neck 44 and frame 16, compressing the jaws 42 and gripping the wire 6. The wire 6 may be readily released by pulling on the knob 46 against the pressure of spring 52.

Figure 13:
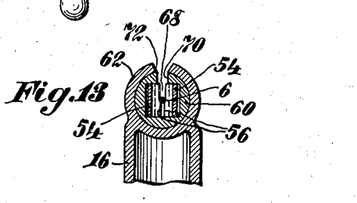
Fig. 13 is a sectional view of a wire-tensioning clamp taken on line 13—13 of Fig. 11.

The wires 6 are placed under tension by means of gripping member 14 (Figs. 11 to 13) consisting of a chuck 54 having opposed flexibly united toothed jaws 56, provided with tapered outer faces 58 normally urged inwardly into a sleeve 60 slidably mounted in the outer tubular end 62 of yoke 16 by leaf spring 64. The sleeve 60 is provided with inwardly converging faces 66 which engage the tapered faces 58 of the chuck jaws 56 and cause them to grip the wire 6. The chuck 54, sleeve 60 and the end 62 of yoke 16 are provided with aligned radially opening slots 68, 70 and 72 respectively, so that the wire 6 may be easily and quickly inserted into the chuck 54 as shown in Fig. 13. Pivotally connected to the sleeve 60 (Figs. 11 and 12) is a U-shaped yoke 74, pivotally carrying a handle 75 and link 76 rigid with the handle. The link 76 is pivotally mounted on leaf spring 78 fixed to yoke 16 and acts with yoke 74 as a toggle to exert tension on the wire 6 when the handle is moved to the position shown in Fig. 11. Upon movement of the handle 75 in a counterclockwise direction, the sleeve 60 is moved to the left as viewed in Fig. 11, and the wire 6 may be released from the chuck 54 by movement of the latter to the right against the pressure of spring 64 by means of a finger piece 80.

Having fixed the position of one of the ends of the bone in the fractured member by means of positioning members B, a universally adjustable carriage C (Figs. 1 and 23) for aligning the other portion of the severed or fractured bone is adjusted with relation to the end of the fixed bone so that the center of universal movement of the carriage is aligned with the center of the end of the fixed bone.

The universally adjusted carriage C consists of a base member 82 bridging the frame A, and having pivotally connected split sleeve members 84 and 86 encircling the tubular frame members 2 and adapted to lock the carriage C in longitudinally adjusted position by means of wing screws 88.

It will be understood that alignment of the center of universal movement of the carriage will be accomplished through the aid of an X-ray device and a fluoroscope.

The center of universal movement of the carriage will be referred to hereinafter as D.

Having aligned the carriage C longitudinally of the bone, it may be found necessary to adjust the center of movement D of the carriage transversely of the framework A to align it with the center of the bone. This is accomplished by means of crank 90 (Figs. 2 and 23) which upon rotation turns shaft 92 journalled in bearings 94, 96 and 98 on base member 82 and worm 100 mounted between bearings 96 and 98. Worm 100 meshes with and moves rack 102 slidably mounted and dovetailed in channel 104 of base member 82 (Fig. 1) to transversely align the center of movement D with center of the end of the bone.

In the event that it is then necessary to adjust the center of movement D of the carriage C vertically, this movement may be accomplished through rotation of crank 106, (Figs. 1 and 23) fixed to shaft 108 journalled in housing 110 mounted on rack 102. Shaft 108 carries worm 112 meshing with and rotating worm gear 114 fixed to threaded shaft 116 journalled in the walls of gear housing 110 and extending into cylindrical housing 118 mounted on housing 110. Housing 118 is provided with internal guides 120 engaging in grooves 122 in and guiding a substantially cylindrical sleeve 124 having a base plug 126 threaded to receive the shaft 116 and to be moved in accordance with rotation of shaft 116 by crank 106 to complete the final three directional adjustment of center of movement of the carriage.

Having attained a center of movement at the center of the broken or fractured end of the fixed bone, it is next necessary to grip and hold the severed portion of the bone. If, as in the case of a clean break, the severed portion of the bone is displaced laterally of the fixed end, at an angle thereto, and possibly rotated with respect to the fixed end, means are provided for adjusting a portion of the carriage C, so that the severed bone may be gripped in its displaced position and then rotated, turned and displaced axially to abut the end of the severed portion squarely and accurately against the end of the fixed bone.

The carriage C for supporting the bone holding and position-fixing means includes a cylindrical sleeve 128, rotatably and slidably mounted on housing 118 and rotatably coupled to sleeve 124 by stud shaft and nut 130. The sleeve 128 may be rotated with respect to housing 118 and sleeve 124 by means of a crank 132 fixed to shaft 134 carrying a worm 136 meshing with worm gear 138 on sleeve 124 all mounted in a gear housing 140 at the upper end of sleeve 128. This construction provides for rotary movement of the carriage C about the center of movement D in a horizontal plane.

Movement of the carriage about the center of movement in a vertical plane is produced by means of a crank 142 (Fig. 4) fixed to shaft 144 journalled in housing 146 fixed to cylindrical sleeve 128. Shaft 144 carries a bevel gear 148 which rotates a meshing bevel gear 150 fixed to shaft 152 journalled in housing 146 and carrying worm 154. The housing 146 is provided with an arcuate guideway 156, the center of curvature of which is the center of universal movement D of the carriage C. The guideway 156 is of such cross-sectional shape that an arcuate rack 158 of substantially T-shaped cross-section is slidably received therein with the teeth of the rack 158 meshing with worm 154 whereby rotation of the latter will cause movement of the rack along the guideway.

Spaced along the rack 158 and extending through a slot 160 in the guideway 156 are arms 162 and 164 which through a mechanism to be described, support a telescoping tubular framework 166, supporting the bone-holding yokes E (Figs. 6, 7 and 23).

Figure 2:
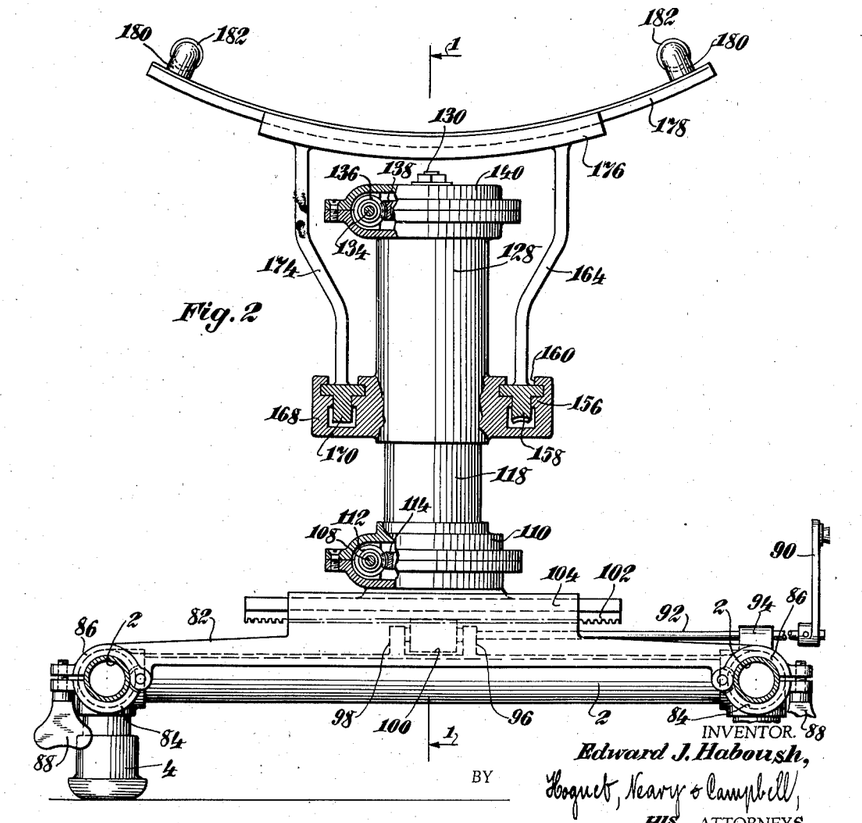
Fig. 2 is a sectional view taken on line 2—2 of Fig. 1, and partly broken away to show details thereof.
Figure 3:
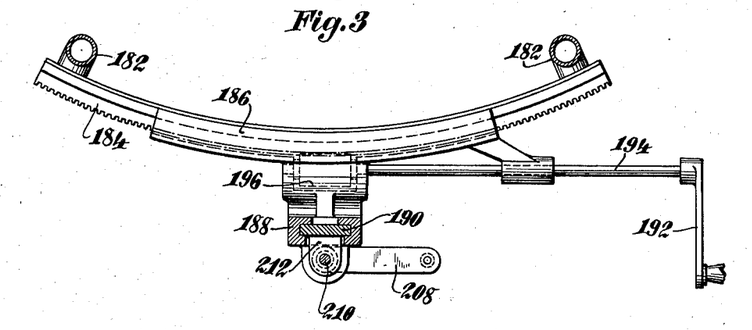
Fig. 3 is a sectional view of the device taken on line 3—3 of Fig. 1.
Figure 4:
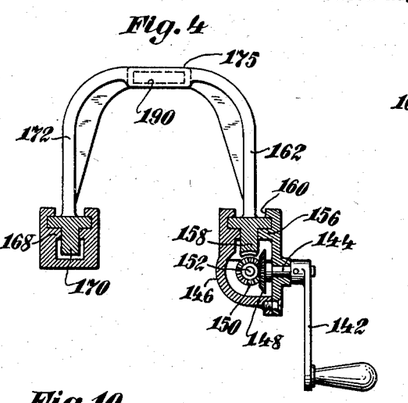
Fig. 4 is a sectional view taken on line 4—4 of Fig. 1.
Figure 5:
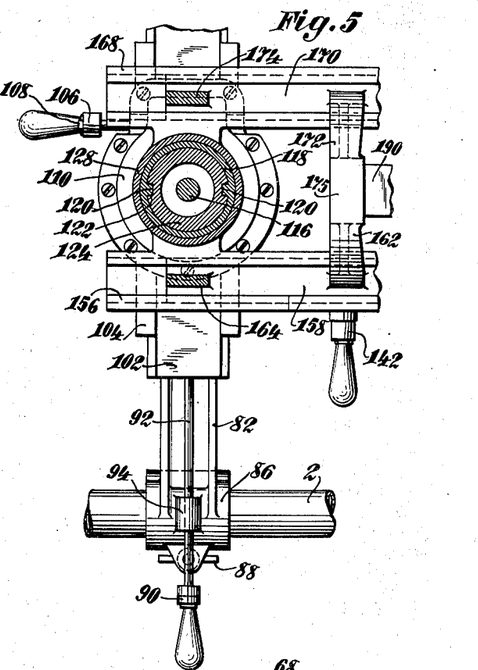
Fig. 5 is a view in section taken on line 5—5 of Fig. 1, and partly broken away.

On the side of the sleeve 128 opposite to guideway 156 and housing 146 is a further guideway 168 similar to 156 and receiving an arcuate slide 170 T-shaped in cross-section and being provided with arms 172 and 174, identical with arms 164 and 162. Arms 172 and 162 connect to form an arcuate bridge 175 (Fig. 4). As best seen in Figs. 1 and 2, arms 164 and 174 carry an arcuate dovetail grooved guide 176 in which is slidably supported a complementary dove-tailed slide 178 to the ends of which are fixed identical tubular members 180. Telescopically mounted on tubular members 180 are identical tubular members 182 which are rigidly attached to arcuate dove-tailed slide and rack 184 slidably supported in an arcuate guide 186. Arcuate guide 186 is provided with a slotted and grooved extension 188 directed in the same direction as and parallel to tubular members 182 and receiving telescopically a bar 190 fixed to the arcuate bridge 175, thereby forming a rigid extensible framework for supporting yokes E for fixing the position of the severed bone, the whole framework 166 being oscillatable in a vertical plane through operation of crank 142.

If the severed portion of the bone has rotated with respect to the fixed end, the framework 166 may be rocked about the axis of the fixed bone by means of crank 192 fixed to shaft 194 journalled in arcuate guide 186 and carrying worm 196 meshing with and sliding the rack 184 in guide 186. Because of the rigid connection through telescoping members 180 and 182, dovetailed bar 178 slides also in guide 176.

By means of the adjustments controlled by cranks 132, 142 and 192, the framework 166 may be moved into parallelism with the bone of the severed member below the fracture. Holes are then drilled through the member and the bone and wires 6 passed therethrough, and received in a U-shaped portion 198 of yoke E (Figs. 6 and 7). The yoke 198 is provided with wire tensioning means 14 like those disclosed in Figs. 11 to 13 and heretofore described. Yoke 198 is provided with an arcuate slide 200 having a center of curvature at the center of wire 6 when tensioned. The slide 200 is slidable in an arcuate guide identical in all respects with guide 20 disclosed in Figs. 8 and 9, and is rotatably supported in a bridge 202 having split pivoted sleeves 204 receivable on and capable of being fixed to tubular members 182 of framework 166 by wing screws 206. Bridge member 202 is, like member 10, provided with a latch 30 and set screw 38 for locking the yoke 198 in any rotated position, and upon application of tension to wire 6 through tensioning clamps 14 the bone may be fixed against movement in one direction relative to framework 166. Through the use of two or three of these yoke members, the severed bone may be fixed against movement in any direction relative to framework 166.

Referring back to Fig. 1, with both portions of the severed bone held in yokes B and E the crank 208 may then be rotated, turning screw 210 threaded into lug 212 in slide bar 190 and the severed ends of the bone drawn clear of each other. Through rotation of the cranks 132, 142 or 192, the ends of the severed bone may be then rotated or swung until they are in exact alignment, and then allowed to come together by reverse rotation of crank 208.

With the ends of the severed bone abutting in accurately fitted relation a cast may be placed about the member maintaining it in its proper position, the wires 6 thereafter withdrawn and the patient then removed in order to let the fracture mend.

It will be understood that two universally adjustable carriages C may be used simultaneously, one of them replacing the bone-holding yokes B, when the position of the fractured member is such that a double universal movement is necessary to set the fracture.

Figures 14, 17:
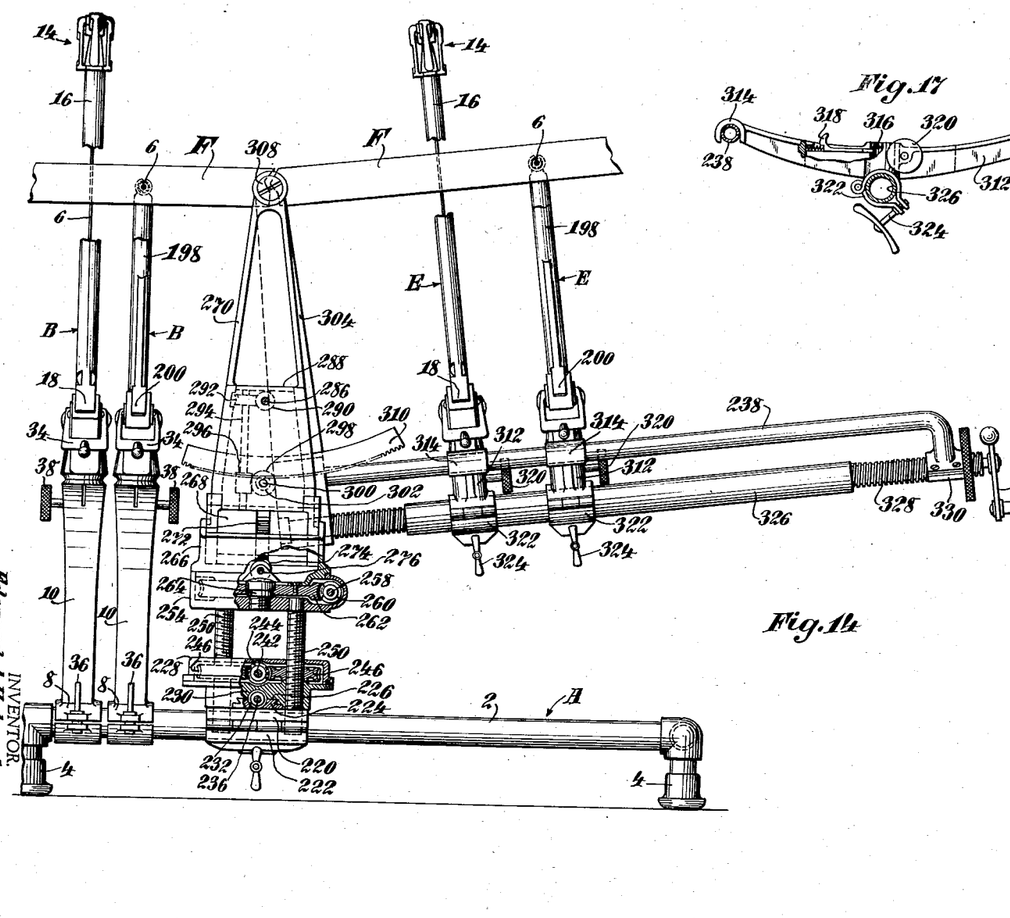
Fig. 14 is a view in elevation and partly broken away of a modified form of the apparatus with the yokes for positioning the severed members attached in their operative positions.
Fig. 17 is an elevational view of a guide member for a yoke, for use with the apparatus disclosed in Fig. 14.
Figure 15:
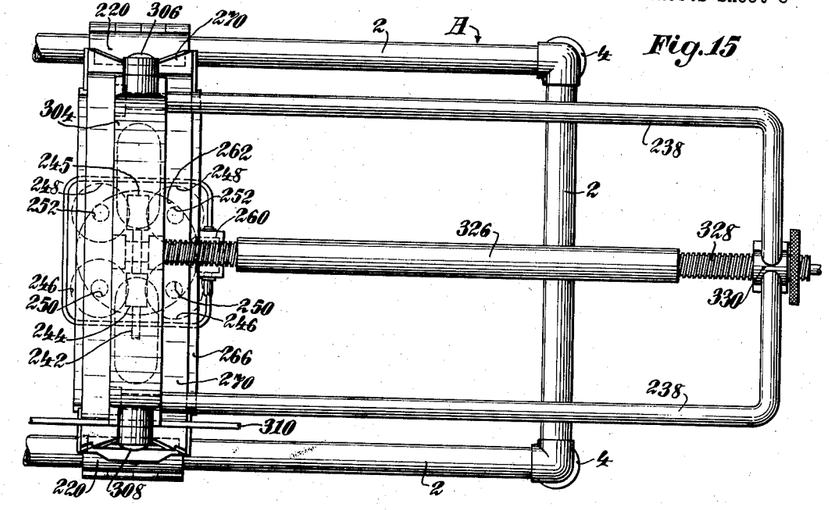
Fig. 15 is a plan view, partly broken away, of the apparatus disclosed in Fig. 14, with the yokes removed.
Figure 16:
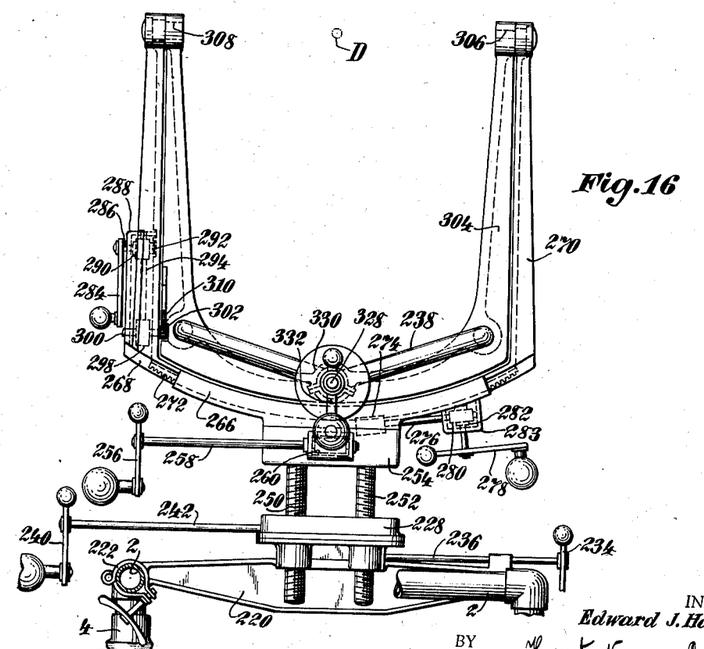
Fig. 16 is an end view of the apparatus disclosed in Fig. 14, partly broken away.

In Figures 14 to 16, is disclosed a modification of the universally adjustable carriage mounted on a base member or framework A like that of Fig. 1, and cooperating with bone-holding yokes B, like that of the above described modification for holding severed or fractured portions of bone F.

The carriage is provided with a base-member bridge 220 having split clamps 222 for locking the bridge in any desired longitudinally adjusted position on the base framework A. The bridge 220 is provided with a longitudinal dovetailed guide 224 extending transversely of the base member A and engaging in a complementary dovetailed groove 226 in gear housing 228. The dovetailed groove 226 is provided with a rack 230 meshing with worm 232 rotated by crank 234 through shaft 236 journalled in bridge 220 to shift the gear housing 228 and attached framework 238 transversely of the base A.

Vertical movement of framework 238 is produced through rotation of crank 240 fixed to shaft 242 and worms 244 and 245 journalled in gear housing 228 meshing with oppositely rotatable pairs of worm gears 246 and 248, threaded on pairs of shafts 250, and 252, so that rotation of the gears 246 and 248 will cause relative vertical movement of the gear housing 254 with respect to bridge member 220 and base member A.

Rotation of framework 238 in a horizontal plane is accomplished through rotation of crank 256 fixed to shaft 258 journalled in gear housing 254 and carrying worm 260 meshing with and rotating worm gear 262 rotatably mounted on stud shaft 264 fixed to gear housing 254. Fixed to gear 262 for rotation therewith and relative to gear housing 254 is an arcuate guide 266 having a depending collar rotatably engaging the gear housing 254. Slidable in guide 266 is a slide 268 forming the base of a U-shaped yoke 270. Slide 268 is provided with an arcuate rack 272 meshing with worm 274 carried by shaft 276 journalled in guide 266, shaft 276 being rotated by crank 278 and worm 280 and worm gear 282 supported in gear housing 283 on guide 266 to cause the yoke 270 to rotate about the center generally indicated as D.

Swinging movement of framework 238 in a vertical plane passing through center D is produced by crank 284 on the left arm of yoke 270 as viewed in Fig. 16. Crank 284 is fixed to a shaft 286 journalled in gear housing 288 in yoke 270 and carries a worm 290 (Fig. 14) meshing with worm gear 292 fixed to vertical shaft 294 so that rotation of crank 284 is transmitted to worm 296 fixed to shaft 294 and rotates fixedly connected worm gear 298, shaft 300 and pinion 302. Rotation of pinion 302 causes swinging movement of U-shaped frame 304 pivotally connected to the free ends of yoke 270 by stub shafts 306 and 308 through arcuate rack 310, rigidly attached to the left-hand arm of frame 304, as viewed in Fig. 16.

U-shaped frame 304 carries the framework 238 directly, the latter being a generally U-shaped member rigidly attached to the arms of frame 304, and moving with it throughout all its movements.

The framework 238 carries the bone-positioning yokes similar to yokes E of Figs. 6 and 7 for the severed portion of the bones. The yokes are identical with yokes 198 of Figs. 6 and 7, differing only in the type of member bridging the space between the arms of frame 238. The bridge member, shown in Fig. 17 consists of an elongated member 312 having concavo-convex ends 314 which receive the arms of framework 238 and slide thereupon. Centrally of the member 312 is a vertical bore 316 for receiving the stub-shaft 28 on yoke guide 20. The bridge member 312 is provided with a latch 318 and clamping set screw 320. Below the lower end of bore is a split collar 322 and a set screw 324 for clamping the bridge member firmly to internally threaded tube 326 disposed between and slightly below the arms of framework 238. Tube 326 threadably engages threaded shaft 328, journalled in U-shaped frame 304 and bearing 330 in framework 238, whereby rotation of crank 332 fixed to shaft 328 will shift the tube 326 and bone positioning yokes axially of the framework 238 to tension and separate, if necessary, the severed ends of the bone.

In use, this modification of the device is operated in the same manner as the preferred embodiment.

Figure 18:
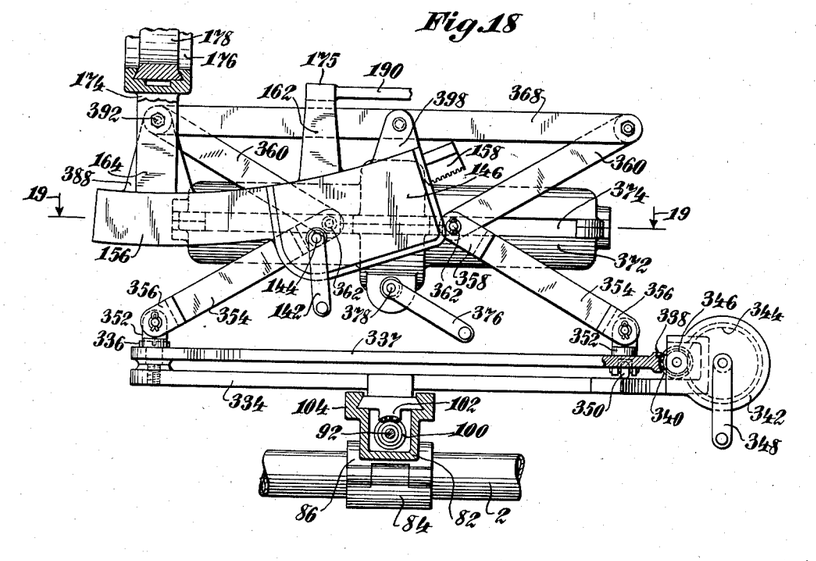
Fig. 18 is a side elevation of a modified form of elevating device partly in section.
Figure 19:
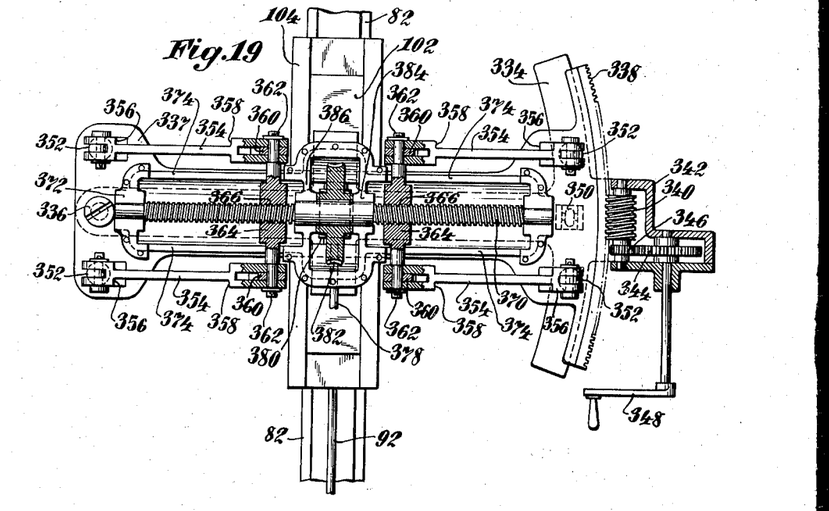
Fig. 19 is a sectional view taken on line 19—19 of Fig. 18, partly broken away.
Figure 20:
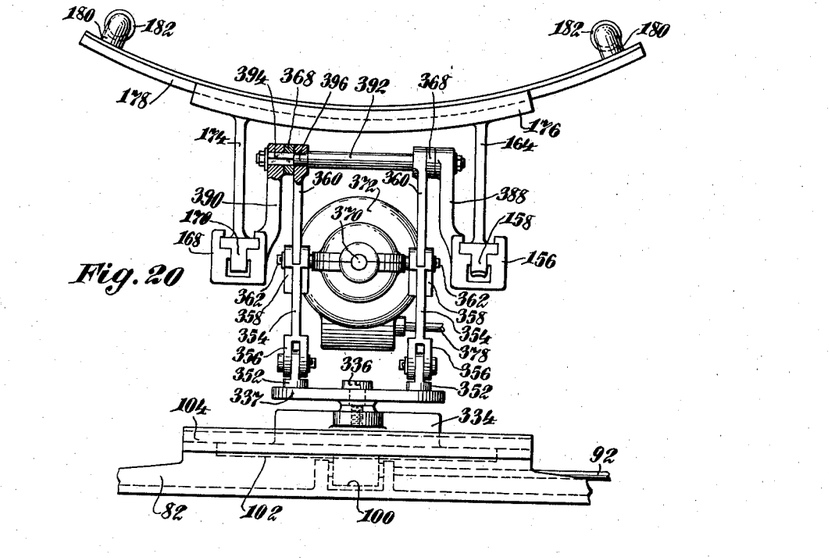
Fig. 20 is an end elevation of the elevating device disclosed in Fig. 18.

A further modification of the vertical elevating mechanism and horizontal plane swing movement is disclosed in Figures 18 to 20. In this mechanism the transverse shift is identical with that of the preferred embodiment and is indicated by the corresponding numerals. The rack 102 in this modification carries a T-shaped base plate 334 to the left end of which, as viewed in Fig. 18 is pivotally connected through set screw 336, a generally I-shaped plate 337 having an arcuate rack 338 at its right end meshing with and movable by a worm 340 journalled in housing 342 integral with T-shaped plate 334. Worm 340 is driven by gear 344 and pinion 346 fixedly connected to crank 348 and worm 340, respectively, whereby rotation of crank 348 causes movement of plate 337 about pivot 336, plate 337 being supported in its movement across plate 334 by a roller 350.

At opposite ends of I-shaped plate 337 are pairs of identical perforated lugs 352 to which are pivotally connected identical links 354 having bifurcated ends 356 straddling the lugs 352. The opposite ends 358 of links 354 are also bifurcated and straddle links 360, the links 360 and links 354 being pivotally connected by transverse shafts 362 having an enlarged center portion 364 with a threaded bore 366 therethrough. The pivotally connected links form a toggle connection between the base plate 337 and links 368 connecting the outer ends of links 360. The toggle structure is extended or contracted by means of a threaded shaft 370 passing through the threaded bores 366 in the enlarged transverse shafts 364 and journalled in the ends of an elongated two part housing 372 having axial slots 374 therein through which the shafts 362 extend. The threaded shaft is driven by means of crank 376 fixed to shaft 378 and worm 380 which meshes with and drives worm gear 382 fixed to threaded shaft 370. Worm gear 382 and shaft 370 are maintained against axial shifting movement by bearings 384 in webs 386 extending across the housing 372. As shaft 370 is rotated the toggle links 354 and 360 are extended or contracted by movement of transverse shafts 362 along the threaded shaft.

The vertical swing mechanism used with the above described elevating mechanism is the same as that described in connection with Figures 1 to 5, and need not be described in detail herein, as the disclosure is believed adequate.

The housing 146, and arcuate guides 156 and 168 are connected through lugs 388 and 390 to links 368 by shaft 392 having squared ends 394 passing through lugs 388 or 390 and links 368 to prevent relative rotation therebetween. The links 360 may also be received on cylindrical sections 396 of shaft 392. As shown in Fig. 18 additional lugs 398 may be used to connect the guides 156 and 168 to links 368 to more rigidly connect them.

Figure 21:
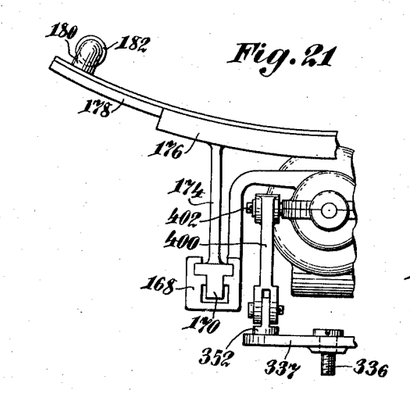
Fig. 21 is an end view of a further modification of an elevating device, partly broken away.
Figure 22:
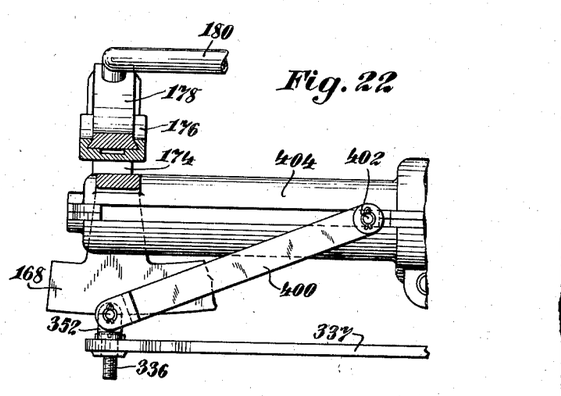
Fig. 22 is a side elevation of a portion of the elevating device disclosed in Fig. 21; and, Fig. 23 is a perspective and diagrammatic view of the form of the invention disclosed in Figs. 1 to 3 with bone-holding yokes attached thereto.

In Figures 21 and 22 is disclosed a still further modification of the elevating means. In this modification, the elevating and horizontal swing mechanisms are the same as those disclosed in Figures 18 to 20, but only two pairs of links are used instead of the toggle construction of the preceding modification, links 400 being swung by displacement of the shafts 402 through rotation of the threaded shaft in housing 404. The vertical swing guide 168 is directly connected to the housing 404 and guides the slides 174 during the swing movement.

It will be understood that the devices described are illustrative only and that there can be many modifications of the elements of the apparatus, and that therefore, the invention should be limited only by the scope of the appended claims.

I claim:

1. An orthopedic device for setting fractured bones, comprising a base means, a plurality of members detachably and adjustably connected to the base means for holding and fixing the position of a portion of the bone above the fracture relatively to the base means, a standard on said base means, a universal joint on said standard, frame means connected at one end to the universal joint and movable about a point at the center of the fractured end of the fixed bone, means mounted on said frame means and disposed outwardly of said universal joint for holding the severed portion of bone below the fracture, and means for moving the frame means to align the second mentioned portion of bone with the first mentioned portion of bone.

2. An orthopedic device for setting fractured bones comprising a base, members for holding and fixing the position of a portion of the bone above the fracture in spaced relation to the base, means for aligning the portion of the bone below said fracture with the bone portion above the fracture, comprising a supporting element having members thereon for holding and fixing the position of the portion of the bone below the fracture relatively to the supporting element, an extensible standard connected by a universal joint to an end of the supporting element between the members for holding portions of bone and adjustable longitudinally and transversely of the base, means associated with the standard for oscillating the supporting element in vertical and horizontal planes about the universal joint, and means for adjusting the standard to align the adjacent ends of the two portions of bone in their relative positions.

3. An orthopedic device for setting fractured bones, comprising means including angularly related tensioned wires adapted to pass through a portion of the bone above the fracture for fixing the position of the bone, means for holding the severed portion of the bone including a supporting member, tensioned wires adjustably mounted on said supporting member and adapted to pass through a portion of the bone below the fracture, said holding means being an adjustable standard supporting and connected by a universal joint to the end of said supporting member between the means for holding the portions of bone above and below the fracture, means for adjusting the standard to bring the center of movement of the universal joint into coincidence with the center of the severed end of the portion of bone above the fracture, and means for moving the member about the universal joint to align the second-mentioned portion of the bone axially with the first-mentioned portion of bone.

4. In an orthopedic device for setting fractured bones, a base member, a plurality of bone-positioning yokes supported on and adjustable longitudinally of the base member, a supporting member, bone positioning yokes mounted on said supporting member, an extensible standard on and adjustable longitudinally and transversely of said base member, means connecting the end of the supporting member adjacent the first mentioned yokes to the standard for universal movement about a point in axial alignment with a bone positioned by the yokes on the supporting member, and means for swinging the supporting member in vertical and horizontal planes to move the end of the bone distant from the point without substantially displacing the end of the bone adjacent the said point.

5. In an orthopedic device for setting fractured bones, a base member adapted to receive in fixed position a plurality of bone positioning means, a framework adapted to receive bone position yokes extending longitudinally of the base member, upright means mounted on and adjustable longitudinally of the base member, a universal joint connecting the inner end of the framework to the upright means in spaced relationship to the base member, means for shifting said framework bodily in planes perpendicular and parallel to the base member to shift the center of movement relatively to the base member, and means for swinging the framework in planes perpendicular and parallel to the base member about a point adjacent to but spaced from the said inner end to allow universal movement of the framework about said point.

6. In a wire tensioning device for use with a bone positioning wire, the combination of a frame, a sleeve in the frame having inwardly converging walls, a chuck member slidably mounted in the sleeve having a plurality of flexibly connected toothed jaws having tapered outer surfaces, and resilient means urging the tapered surfaces of the chuck jaws into contact with converging walls of the sleeve to compress the jaws into engagement with and gripping relation to the wire.

7. In a wire tensioning device for use with a bone positioning wire, the combination of a frame, a sleeve slidably mounted in the frame and having inwardly converging internal wall portions, a chuck member slidable in said sleeve and having flexibly connected toothed jaws with tapered outer surfaces, resilient means urging the chuck jaws into the sleeve and means connected to the frame and the sleeve for urging the sleeve oppositely to the direction in which the chuck is urged.

8. The combination defined in claim 7 in which the frame, the sleeve and the chuck are provided with aligned axial slots opening radially of the frame whereby a wire may be inserted into the chuck from exteriorly of the frame.

9. In an orthopedic device for setting fractured bones, a base member, supporting means adjustable longitudinally of the base member, elevating means mounted on the supporting means for movement perpendicularly and rotatably with respect to the base member, an elongated framework connected at one end to the elevating means for swinging movement in a plane perpendicular to the base member and adapted to receive bone positioning yokes disposed outwardly of said one end, and means for individually elevating and rotating the elevating means and swinging the framework relatively to the base member, whereby the framework may be moved universally relatively to the base member about a point spaced from the framework and the base member.

10. In a device for setting fractured bones, a base member, means for fixing the position of the fractured end of a portion of bone above the fracture, a framework movable relatively to the base member, means mounted between the ends of the framework for engaging a portion of the bone below the fracture, and means for movably connecting one end of the framework adjacent to the means for fixing the position of the portion of bone above the fracture to the base member comprising a housing perpendicular to the plane of the base member, a sleeve slidable in the housing, a rotatable shaft threaded into said sleeve, means for rotating said shaft to move the sleeve perpendicularly to the base member, and a universal joint interposed between said sleeve and said one end of the framework.

11. In a device for setting fractured bones, a base member, means for fixing the position of the fractured end of a portion of bone above the fracture, a framework movable relatively to the base member, means on said framework for engaging a portion of the bone below the fracture, means for movably connecting the framework to the base member comprising a housing perpendicular to the plane of the base, a sleeve non-rotatably slidable in the housing, a rotatable shaft threaded into the sleeve, means for rotating said shaft to move the framework perpendicularly to the base member, a sleeve slidable on and externally of said housing, means rotatably connecting the sleeves and means for rotating the external sleeve relatively to the housing.

12. In a device for setting fractured bones, a base member, means for fixing the position of the fractured end of a portion of bone above the fracture, a framework movable relatively to the base member, means on said framework for engaging a portion of the bone below the fracture, means for movably connecting the framework to the base member comprising a housing perpendicular to the plane of the base, a sleeve non-rotatably slidable in the housing, a rotatable shaft threaded into the sleeve, means for rotating said shaft to move the framework perpendicularly to the base member, a sleeve slidable on the exterior of the housing, parallel arcuate guideways on the sleeve, complementary arcuate slides on the framework slidable in the guideways and means for moving the slides along the guideways to adjust the framework.

13. In a device for setting fractured bones, the combination of a base member, a support movable along the base member, elevating means mounted on said support, a frame for receiving bone-holding yokes, a universal joint connecting the inner end of the frame to said elevating means for oscillatory movement about a first axis parallel to the base, for rotary movement about a second axis intersecting the first axis, and movement about a third axis perpendicular to said base which passes through the intersection point of the first and second axes, means for moving the bone-holding yokes axially of said frame and means for individually adjusting the elevating means and the frame relative to the base member.

14. In a device for setting fractured bones, the combination of means for fixing the proximal fragment of the fractured bone against movement, means for holding the distal fragment of the fractured bone, means comprising a universal joint supporting said holding means for movement of the latter in horizontal and vertical planes about a center of movement between said holding and fixing means, means for relatively adjusting the universal joint and fixing means to bring said center of movement into coincidence with the center of the fractured end of the proximal fragment, and means for moving said holding means in the said horizontal and vertical planes and toward and from said fixing means.

15. In a device for setting fractured bones, a base member, means on said base member for fixing the position of the end of a portion of a bone above a fracture, means for engaging a portion of the bone below said fracture, means comprising a vertically and horizontally movable universal joint having a center of movement in axial alignment and closely adjacent to the fractured end of the portion of bone below the fracture for moving said portion about the center of movement, and means for moving the universal joint to bring into coincidence the center of movement and the center of the fractured end of the first-mentioned portion of bone.

EDWARD J. HABOUSH.